(12) United States Patent
Kobelev et al.

(10) Patent No.: US 7,334,784 B2
(45) Date of Patent: Feb. 26, 2008

(54) CORRUGATED SPRING WITH GRADUAL PROGRESSIVE SPRING CHARACTERISTIC

(75) Inventors: Vladimir Kobelev, Attendorn (DE); Bernfried Hesselmann, Wenden (DE); Andreas Rinsdorf, Freudenberg (DE)

(73) Assignee: Muhr und Bender KG, Attendorn (DE)

( * ) Notice: Subject to any disclaimer, the term of this patent is extended or adjusted under 35 U.S.C. 154(b) by 0 days.

(21) Appl. No.: 10/845,823

(22) Filed: May 14, 2004

(65) Prior Publication Data
US 2005/0093216 A1 May 5, 2005

(30) Foreign Application Priority Data
May 14, 2003 (DE) .................. 103 21 800

(51) Int. Cl.
*F16F 1/34* (2006.01)

(52) U.S. Cl. ...................... 267/161; 267/162

(58) Field of Classification Search ............ 267/161, 267/162
See application file for complete search history.

(56) References Cited

U.S. PATENT DOCUMENTS

| | | | | |
|---|---|---|---|---|
| 2,380,900 | A * | 7/1945 | Wellman ................ | 192/107 C |
| 4,901,987 | A * | 2/1990 | Greenhill et al. ........... | 267/166 |
| 5,639,074 | A * | 6/1997 | Greenhill et al. ........... | 267/162 |
| 6,050,557 | A * | 4/2000 | Shimoseki ................. | 267/162 |
| 6,068,250 | A * | 5/2000 | Hawkins et al. ........... | 267/162 |
| 6,758,465 | B1 * | 7/2004 | Greenhill et al. ........... | 267/166 |
| 2003/0222385 | A1 * | 12/2003 | Cai et al. ................... | 267/162 |

* cited by examiner

Primary Examiner—Bradley King (57) ABSTRACT

Axial corrugated spring comprising an annular spring band 11 which describes a corrugation line oscillating about a radial reference plane around the circumference, wherein the corrugation line has maxima 12, 13, 17 of different height and minima 14, 15, 16 of different height.

4 Claims, 8 Drawing Sheets

$$c = \frac{\text{Force}}{\text{Path}}$$

CORRUGATED SPRING WITH GRADUAL PROGRESSIVE SPRING CHARACTERISTIC

BACKGROUND OF THE INVENTION

The invention relates to corrugated springs comprising an annular spring band which describes a corrugation line oscillating about a reference surface over the circumference. Such corrugated springs are known as so-called "axial corrugated springs" for absorbing axial forces in a spring fashion wherein the corrugation line oscillates over the circumference relative to a radial plane which lies normal to the ring axis. In this case, the spring band is generally closed in a ring shape. Such corrugated springs are furthermore known as so-called "radial corrugated springs" in which the spring band oscillates over the circumference relative to a ring cylinder which lies coaxial to the ring axis. Corrugated springs of this type are generally slotted over the circumference. Corrugated springs of said types have an almost linear spring characteristic with a constant spring state (spring stiffness).

For particular applications defined gradual progressive spring characteristics are desirable. With known corrugated springs this has conventionally only been possible by aggregation of a plurality of corrugated springs have different spring characteristics with interposed flat disks.

OBJECT OF THE INVENTION

Starting herefrom, it is the object of the present invention to provide new types of corrugated spring which have a gradual progressive characteristic.

SUMMARY OF THE INVENTION

The solution according to the invention consists in the fact that in corrugated springs of the given type, the corrugation line has a plurality of maxima of different size and minima of different size. If corrugated springs of this type are inserted between two uniform contact surfaces and loaded, they initially come into contact with the contact surfaces with their absolute maxima and minima. In this case, they initially have a substantially linear characteristic with a first lower spring rate (spring stiffness) until they come in contact with the contact surfaces with the next higher relative maxima and minima. At this moment, the spring characteristic changes to an again substantially linear profile with significantly increased spring rate (spring stiffness). If further smaller relative maxima and minima are provided in addition to said larger relative maxima and minima, a further section of the spring characteristic is realized with a linear profile but a further increased spring rate (spring stiffness) which becomes effective when these further relative maxima and minima come in contact with the contact surfaces.

As already stated, the basic shape of the corrugated springs according to the invention, determined by the reference surface, can be substantially conical or cylindrical wherein the first and the last case can be reproduced as a conical shape with a cone angle of 180° or 0°. The generatrices of the spring band run substantially parallel to the respective reference surface.

The profile of the corrugation lines over the circumference of the spring band can form a harmonic profile (oscillation) or an irregular profile (oscillation). A secure contact on the contact surfaces is obtained if the spring band has respectively three maxima and three minima.

SUMMARY OF A PREFERRED USE

A preferred use for axial corrugated springs (radial alignment) or axial radial corrugated springs (conical alignment) lies in the use as an elastic compensating disk in valve clearance compensating elements in the valve gear mechanism of internal combustion engines. In this case the valve clearance compensating elements are constructed as multipart valve spring plates comprising a cup, a plate and an interposed corrugated spring. In this case, one or a plurality of corrugated springs according to the invention can be used for each valve spring plate, wherein it is possible to have a layered arrangement of a plurality of corrugated springs in the same orientation or in opposite orientations. In the first case, the corrugated springs lie flat on one another; in the second case intermediate disks should be used, the corrugated springs abutting linearly with the generatrices of their maxima or minima on the intermediate disks.

SUMMARY OF A SECOND PREFERRED USE

A second preferred use for axial corrugated springs (radial alignment) consists in their use as a clearance compensating and damping element in multiple-disk clutches of automatic gear mechanisms in motor vehicles. In this case, one or a plurality of corrugated springs are inserted at one end of the disk package of the multiple-disk clutches for coupling the gears, that is on the pressure side or the support side of the disk package. In this case, it is also possible to have a layered arrangement of a plurality of corrugated springs in the same orientation or in the opposite orientations.

DETAIL DESCRIPTION

Figure 1:
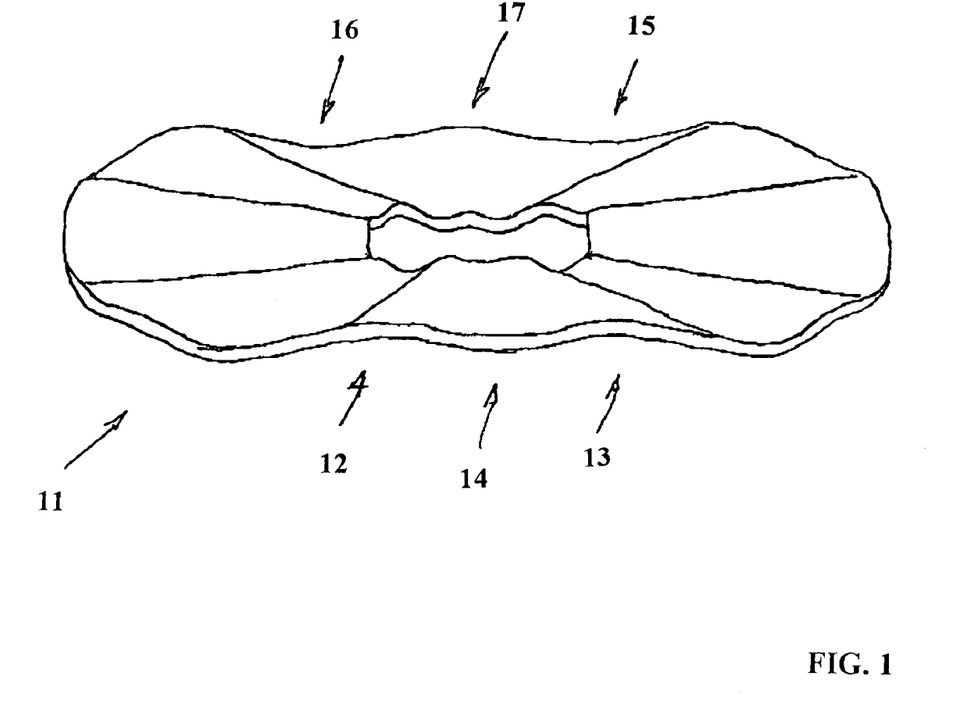
FIG. 1 shows a three-dimensional diagram of an "axial" corrugated spring according to the invention.
Figure 2:
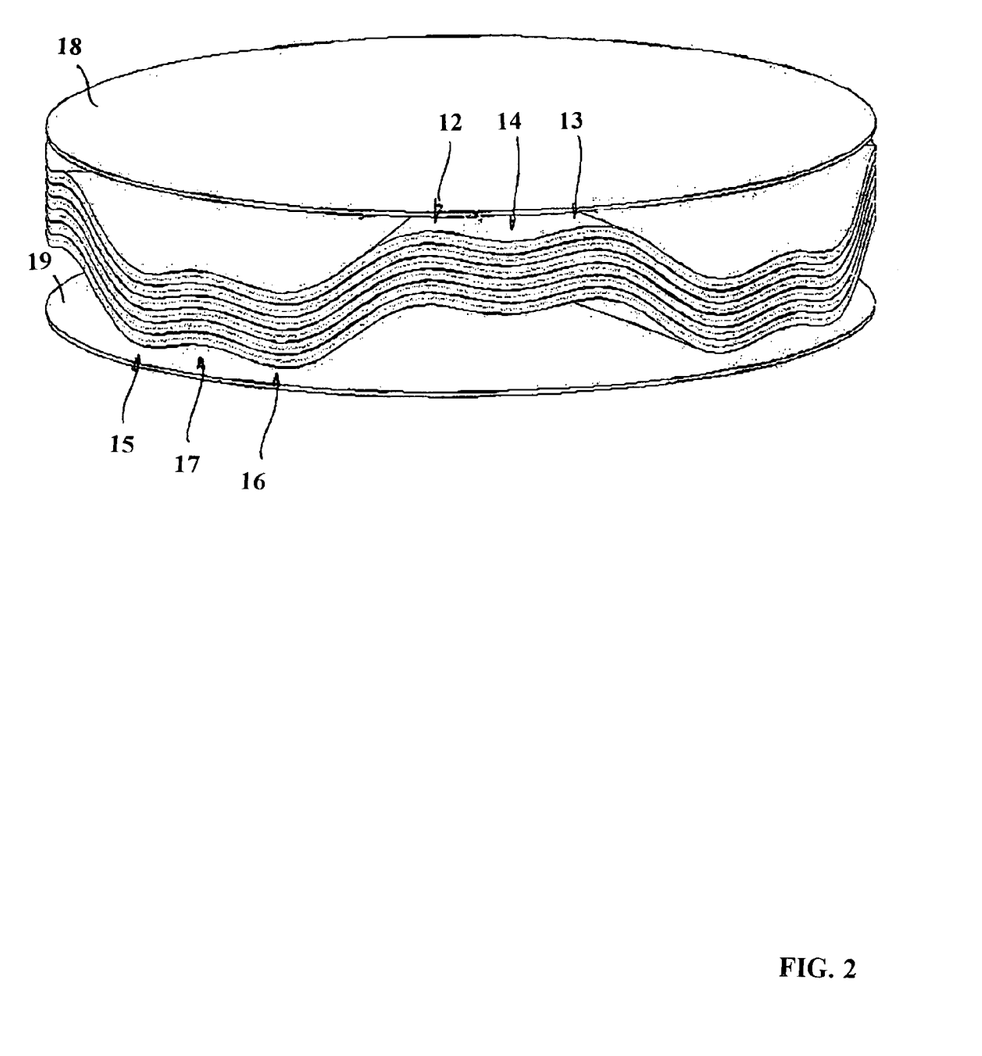
FIG. 2 shows the corrugated spring from FIG. 1 between two contact surfaces shown as disks.
Figure 3:
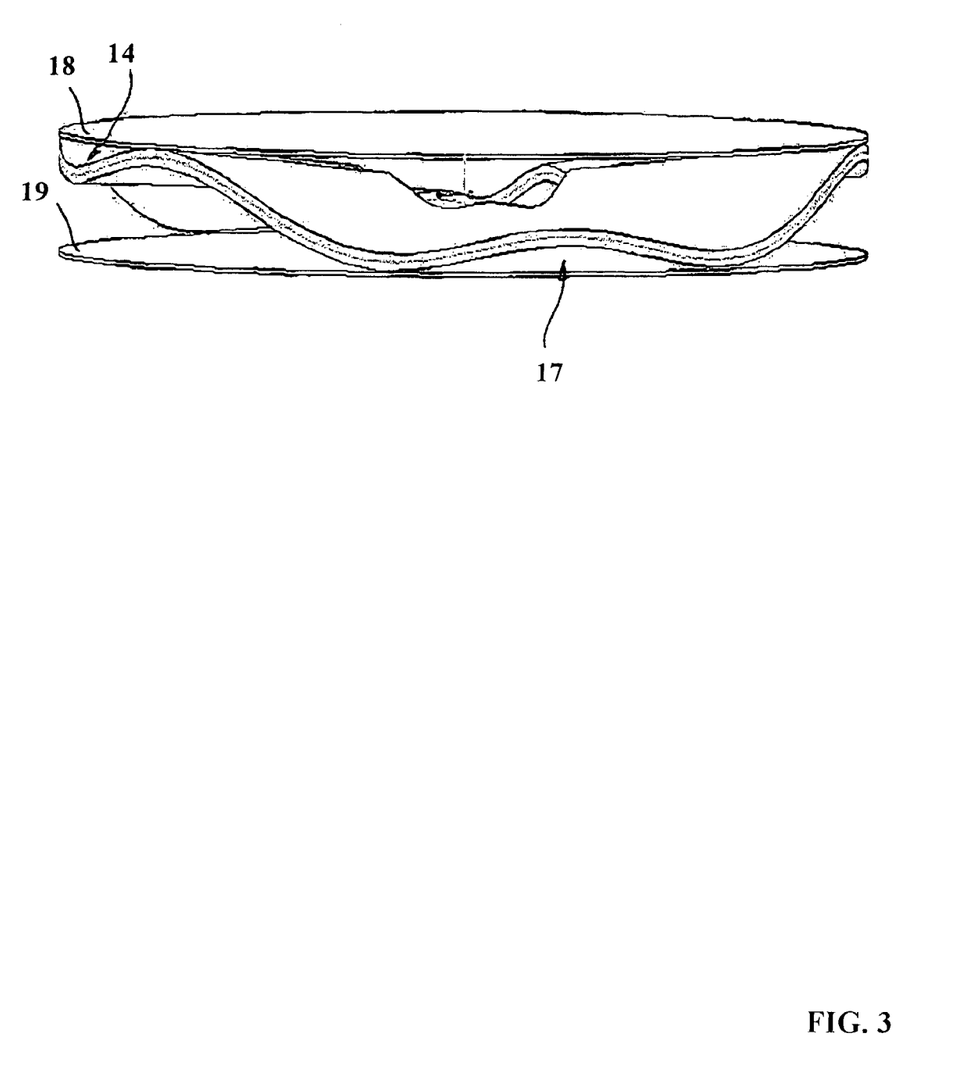
FIG. 3 shows a side view of the corrugated spring from FIG. 2.

FIGS. 1 to 3 are described together in the following:

The "axial" corrugated spring according to the invention consists of an annular spring band 11 having the same width over the circumference, which is closed in a ring shape. The spring band 11 is periodically corrugated relative to a flat radial surface normal to the ring axis as a reference surface, wherein three periods can be identified over the circumference in a phased relationship from superimposed sine or cosine profiles. Between each two absolute maxima 12, 13, there is a relative minimum 14 and between each two absolute minima 15, 16 there is a relative maximum 17. In the unloaded state, the axial corrugated spring according to the invention rests against the radial contact surfaces 18, 19 with its generatrices which form the absolute maxima 12, 13 and the absolute minima 15, 16 whereas the interposed relative minima 14 and relative maxima 17 are at a distance from the respectively corresponding contact surface. It is easily comprehensible that the axial corrugated spring has a first spring stiffness valve as long as the relative minimum 14 is at a distance from the contact surface 19 and the relative maximum 17 is at a distance from the contact surface 18 and that the spring stiffness changes abruptly to a second valve when the relative minimum 14 comes to rest against the contact surface 19 and the relative maximum 17 comes to rest against the contact surface 18.

Figure 4:
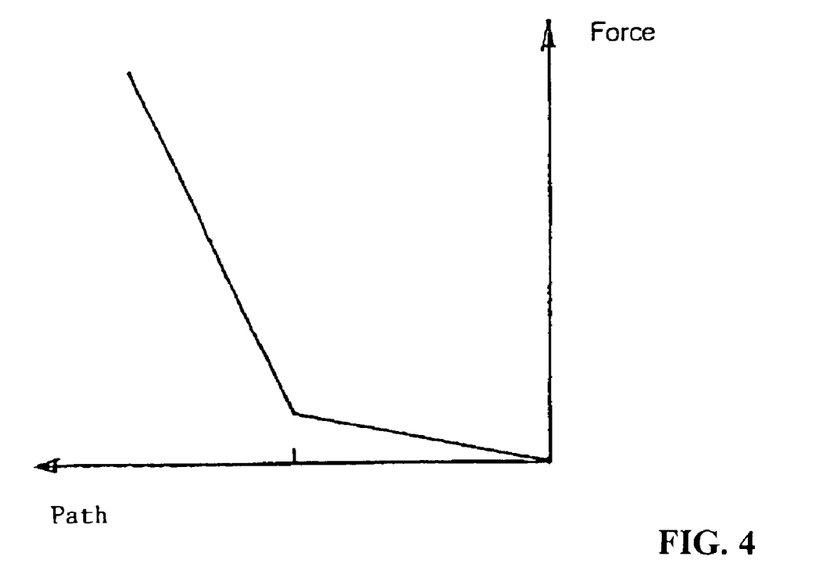
FIG. 4 shows the spring characteristic of a spring from FIGS. 1 to 3.

The spring characteristic obtained therefrom is shown in FIG. 4.

Figure 5:
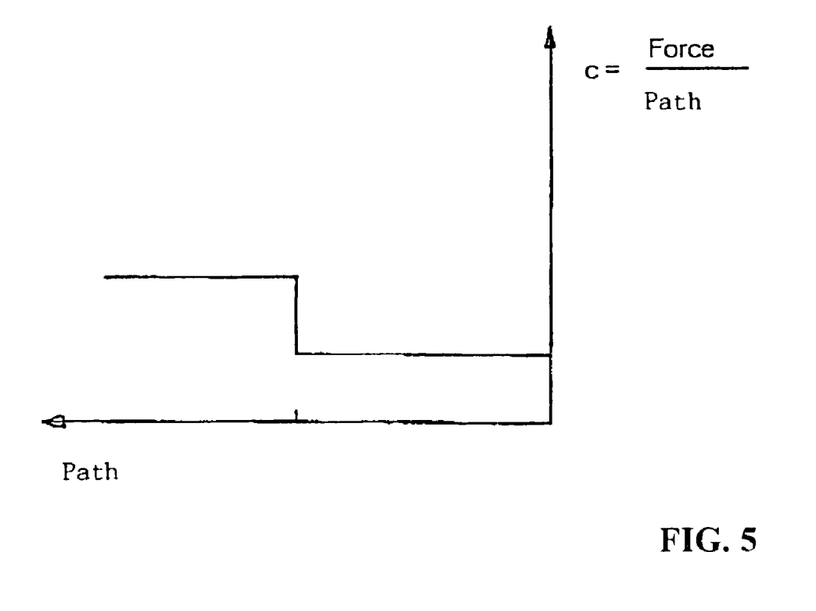
FIG. 5 shows the spring rate over the path of a spring from FIGS. 1 to 3.

The change in the spring rate (spring stiffness) is shown qualitatively in FIG. 5. The path is in each case plotted as shortening of the corrugated spring with negative sign.

Figure 6:
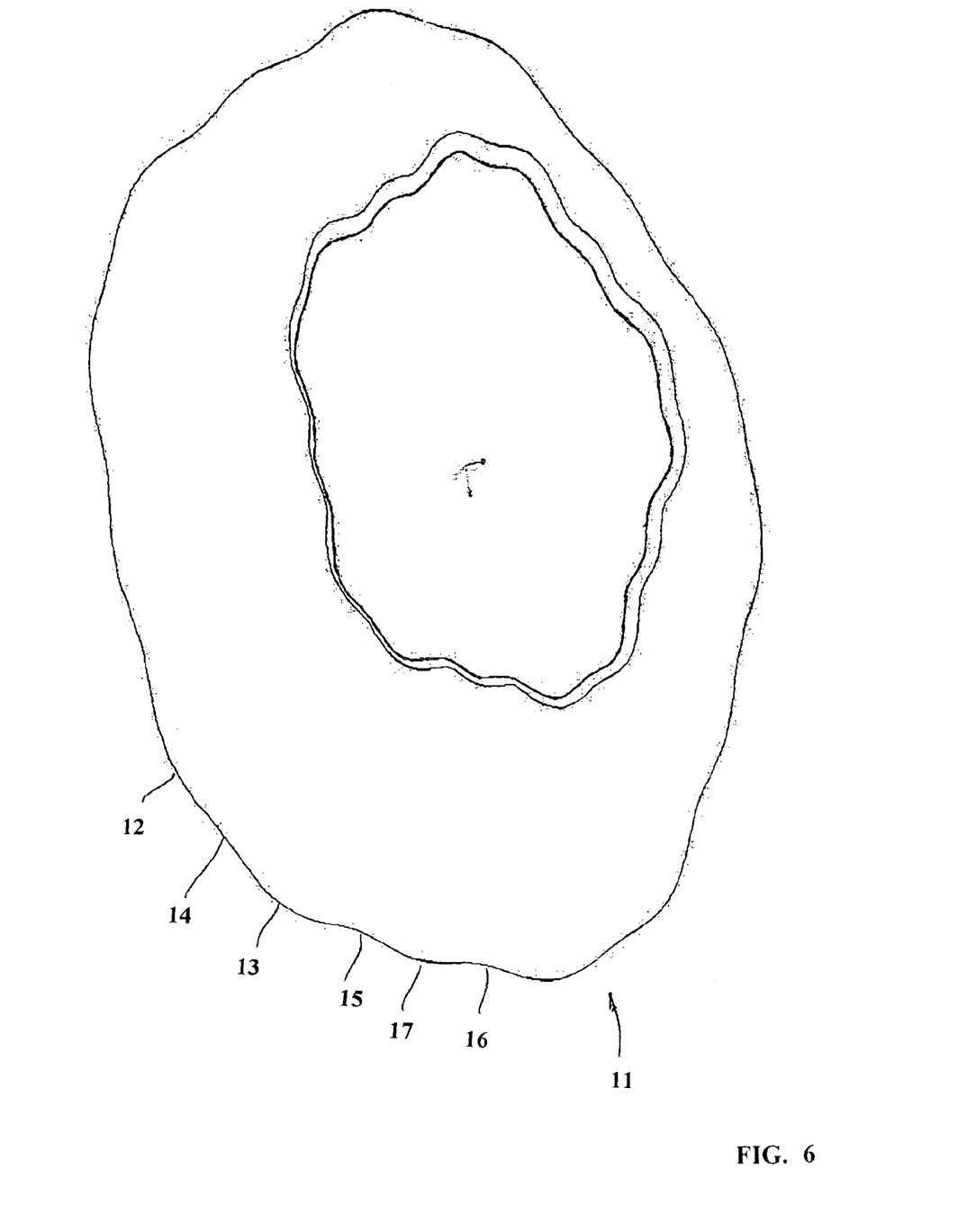
FIG. 6 shows a three-dimensional diagram of an "axial-radial" corrugated spring according to the invention.

The "axial-radial" corrugated spring according to FIG. 6 consists of an annular spring band 11 having the same width over the circumference, which is closed in a ring shape. The spring band 11 is periodically corrugated relative to a cone surface symmetrical to the ring axis as a reference surface, wherein five periods can be identified over the circumference. Between each two absolute maxima 12,13 there is a relative minimum 14 and between each two absolute minima 15, 16 there is a relative maximum 17. In the unloaded state, the corrugated spring according to the invention can rest against conical contact surfaces with its generatrices which correspond to the absolute maxima 12, 13 and the absolute minima 15, 16 whereas the interposed relative minima 14 and relative maxima 17 are at a distance from the respectively corresponding contact surfaces not shown here. In the axial approximation of the two conical contact surfaces a graded spring stiffness also occurs here, which has a first lower valve as long as the relative minima 14 and the relative maxima 17 are at a distance from the contact surfaces whereas the spring stiffness changes abruptly to a second valve when the relative minima 14 and the relative maxima 17 come to rest against said conical contact surfaces.

Figure 7:
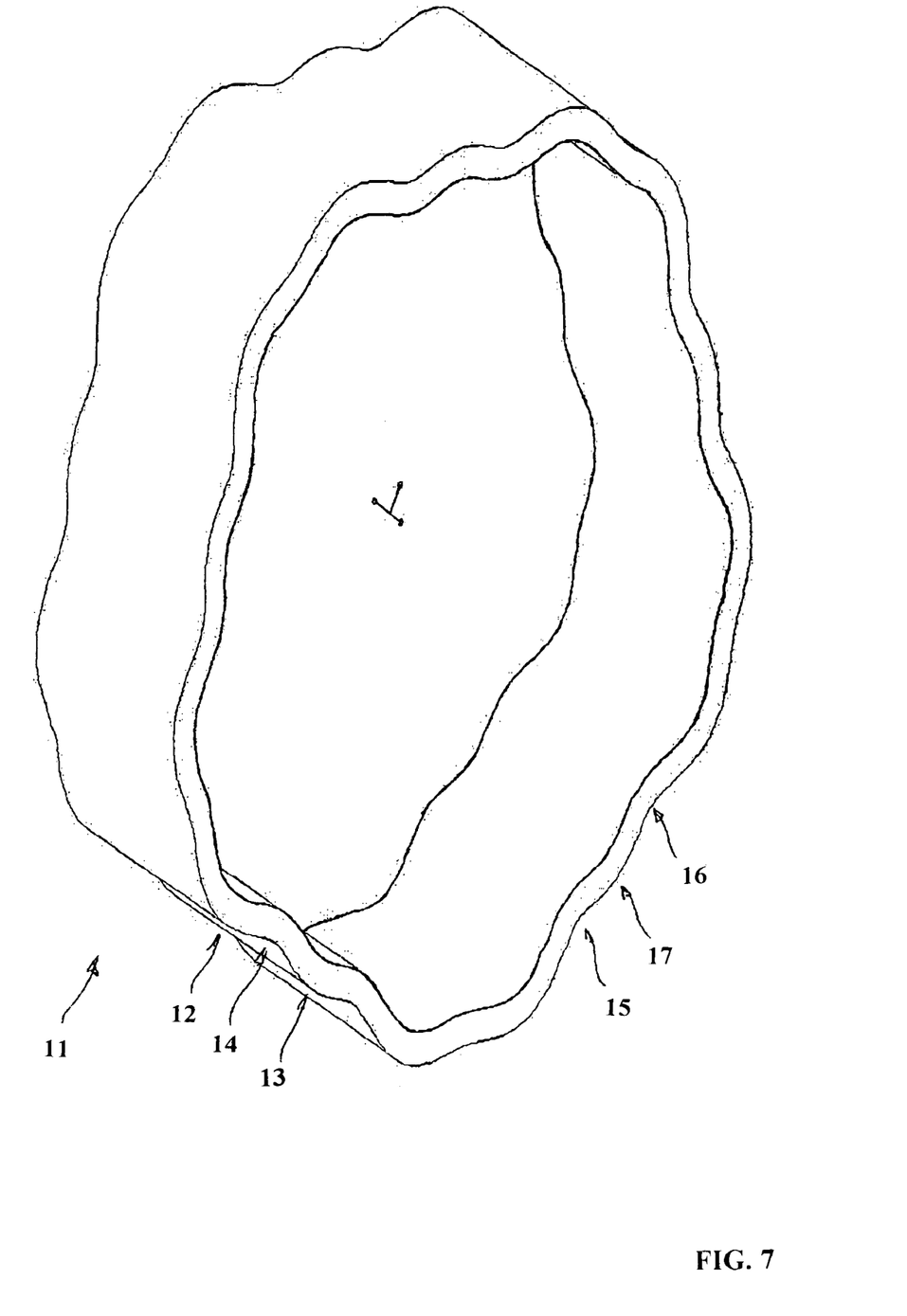
FIG. 7 shows a three-dimensional diagram of a "radial" corrugated spring according to the invention.

The "radial" corrugated spring according to the invention as shown in FIG. 7 consists of an annular spring band 11 having the same width over the circumference which is closed in a ring shape. The spring band 11 is periodically corrugated relative to a cylinder surface located concentrically to the ring axis as a reference surface, wherein five periods are shown over the circumference. Between each two absolute maxima 12, 13 there is a relative minimum 14, between each two absolute minima 15, 16 there is a relative maximum 17 The spring is mounted between two inner- and outer-cylindrical concentric surface sections as a spacer element or tolerance ring wherein generatrices make contact at the absolute maxima 12, 13 and the absolute minima 15, 16 in the unloaded state whereas the interposed relative minima 14 and the relative maxima 17 are at a distance from the corresponding cylindrical contact surfaces. In the event of a radial displacement of the outer cylinder towards the inner cylinder, a deformation of the radial corrugated spring takes place at least in the displacement plane, which is affected by a first lower spring stiffness as long as the corresponding relative minima 14 and the relative maxima 17 are at a distance from their cylindrical opposite surfaces whereas the spring stiffness changes abruptly to a second high value when the relative minima 14 and relative maxima 17 come in contact with the cylindrical opposing surfaces.

Figure 8:
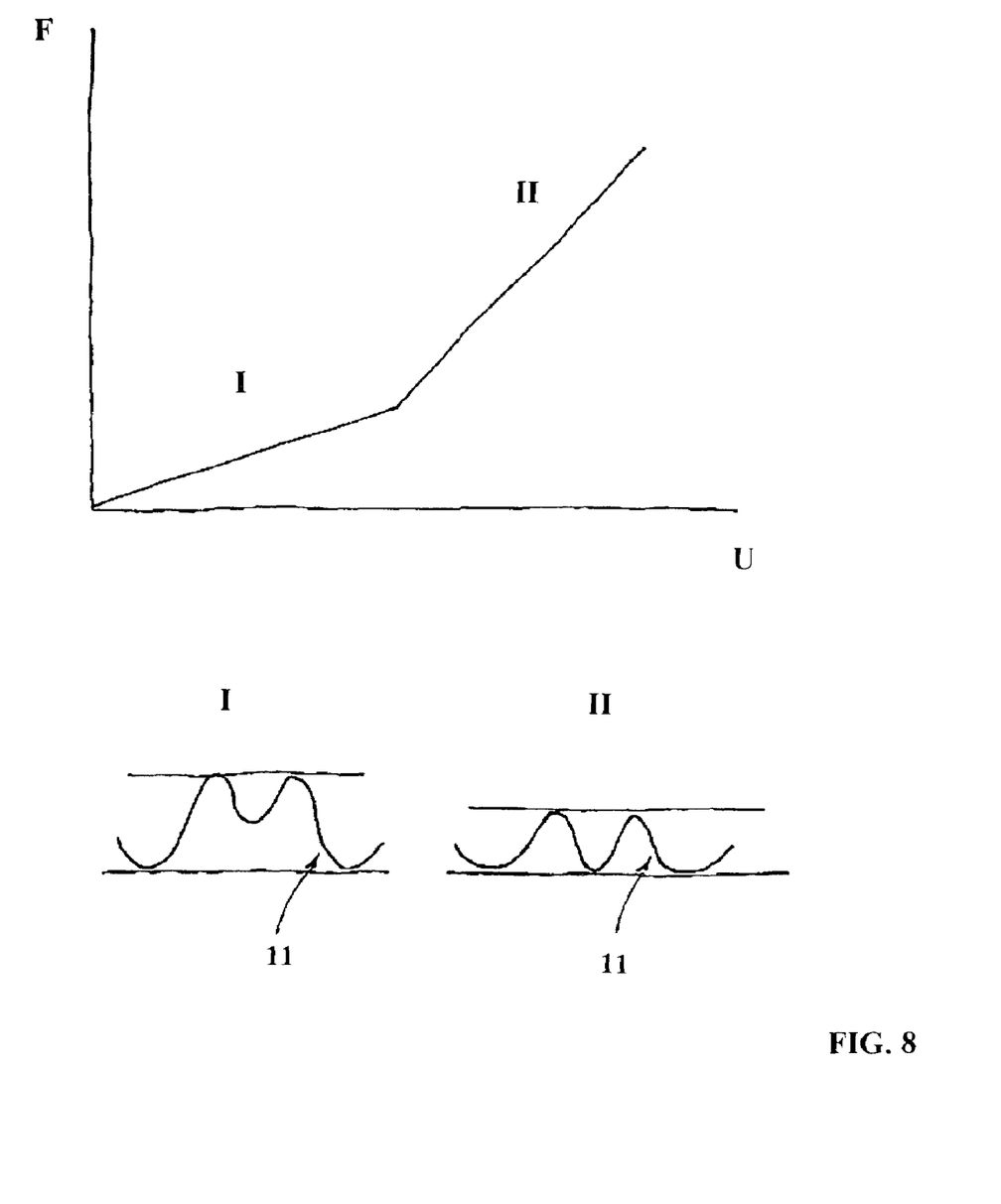
FIG. 8 shows an example of a spring characteristic of a corrugated spring according to the invention.

FIG. 8 shows the spring characteristic of a corrugated spring according to the invention where the spring force F has a gradually increasing scope over the spring distance U. Two sections of different slope can be seen here, each having a configuration of a selection of a corrugated spring 11 according to the invention assigned thereto.

Figure 9:
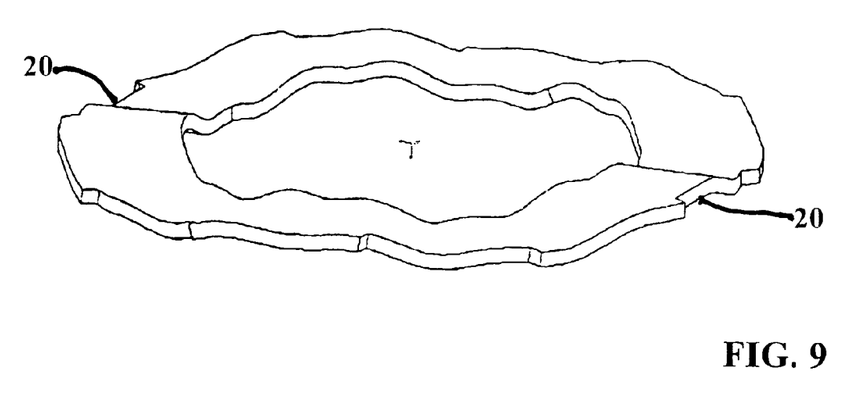
FIG. 9 shows an example of a corrugated spring that is slotted over the circumference according to the invention.

FIG. 9 shows a corrugated sprint that is provided with slots 20 over the circumference according to the invention.

The invention claimed is:

1. An axial corrugated spring comprising a closed annular spring band which describes a corrugation line oscillating about a radial reference plane over the circumference, wherein the corrugation line has a plurality of maxima of different height and a plurality of minima of different height, wherein the corrugation line comprises a plurality of periods over the circumference, wherein between two adjacent absolute maxima (12, 13) there is a relative minimum (14), and wherein between two adjacent absolute minima (15, 16) there is a relative maximum (17), and wherein every second absolute maximum is immediately adjacent to an absolute minimum and vice versa around the circumference.

2. The corrugated spring according to claim 1, wherein the corrugation line is exclusively formed from superimposed sine profiles of the same phase relationship.

3. The corrugated spring according to claim 2, wherein the corrugation line is exclusively formed from superimposed cosine profiles of the same phase relationship.

4. The corrugated spring according to claim 1, wherein the spring band has at least three absolute maxima and three absolute minima.

* * * * *